United States Patent
Liang et al.

(10) Patent No.: US 12,423,965 B2
(45) Date of Patent: Sep. 23, 2025

(54) IMAGE PROCESSING METHOD, APPARATUS AND DEVICE, AND READABLE STORAGE MEDIUM

(71) Applicant: Inspur (Beijing) Electronic Information Industry Co., Ltd., Beijing (CN)

(72) Inventors: Lingyan Liang, Beijing (CN); Gang Dong, Beijing (CN); Yaqian Zhao, Beijing (CN); Qichun Cao, Beijing (CN); Wenfeng Yin, Beijing (CN)

(73) Assignee: INSPUR (BEIJING) ELECTRONIC INFORMATION INDUSTRY CO., LTD., Beijing (CN)

( * ) Notice: Subject to any disclaimer, the term of this patent is extended or adjusted under 35 U.S.C. 154(b) by 332 days.

(21) Appl. No.: 18/032,125

(22) PCT Filed: Jul. 29, 2021

(86) PCT No.: PCT/CN2021/109193
§ 371 (c)(1),
(2) Date: Apr. 14, 2023

(87) PCT Pub. No.: WO2022/078002
PCT Pub. Date: Apr. 21, 2022

(65) Prior Publication Data
US 2023/0401834 A1    Dec. 14, 2023

(30) Foreign Application Priority Data

Oct. 16, 2020   (CN) .......................... 202011110263.X

(51) Int. Cl.
*G06V 10/82*   (2022.01)
*G06N 3/09*    (2023.01)
(Continued)

(52) U.S. Cl.
CPC ............... *G06V 10/82* (2022.01); *G06N 3/09* (2023.01); *G06V 10/40* (2022.01); *G06V 10/762* (2022.01); *G06V 10/764* (2022.01); *G06V 10/98* (2022.01)

(58) Field of Classification Search
CPC .......... G06N 3/09; G06V 10/40; G06V 10/82; G06V 10/98; G06V 10/762; G06V 10/764
See application file for complete search history.

(56) References Cited

U.S. PATENT DOCUMENTS 12,099,915 B2 *   9/2024   Boo .......................... G06N 3/08
2020/0026986 A1   1/2020   Ha et al.

FOREIGN PATENT DOCUMENTS

| CN | 110782021 A | 2/2020 |
|---|---|---|
| CN | 111144511 A | 5/2020 |

(Continued)

OTHER PUBLICATIONS

Computer English Translation of Chinese Patent No. CN 112766456 A. (Year: 2021).*

(Continued)

*Primary Examiner* — Daniel G Mariam
(74) *Attorney, Agent, or Firm* — Crowell & Moring LLP

(57) ABSTRACT

An image processing method, apparatus and device, and a readable storage medium are disclosed, including: obtaining a target image; inputting the target image into a quantized target deep neural network model for classification/detection to obtain an output result; and processing the target image according to a policy corresponding to the output result. A process of performing quantization to obtain the target deep neural network model includes: obtaining a pre-trained floating point type deep neural network model; extracting weight features of a deep neural network model; determining a quantization policy using the weight features; and quantizing the deep neural network model according to the (Continued)

quantization policy to obtain the target deep neural network model.

20 Claims, 4 Drawing Sheets

(51) Int. Cl.
*G06V 10/40* (2022.01)
*G06V 10/762* (2022.01)
*G06V 10/764* (2022.01)
*G06V 10/98* (2022.01)

(56) References Cited

FOREIGN PATENT DOCUMENTS

| | | |
|---|---|---|
| CN | 111723934 A | 9/2020 |
| CN | 112287986 A | 1/2021 |
| WO | WO 2020/081470 A1 | 4/2020 |

OTHER PUBLICATIONS

International Search Report and Written Opinion, including English translations, of corresponding PCT application No. PCT/CN2021/109193), Nov. 4, 2021 (15 pages).

Search report of corresponding CN priority application No. CN202011110263.X dated May 25, 2023 (2 pages).

\* cited by examiner

IMAGE PROCESSING METHOD, APPARATUS AND DEVICE, AND READABLE STORAGE MEDIUM

This application is the national phase application of International Application No. PCT/CN2021/109193, filed Jul. 29, 2021, which claims priority to China Patent Application No. 202011110263.X, filed on Oct. 16, 2020 in China National Intellectual Property Administration and entitled "IMAGE PROCESSING METHOD, APPARATUS AND DEVICE, AND READABLE STORAGE MEDIUM", each of which are hereby incorporated by reference in their entirety.

FIELD

The present application relates to the technical field of computer applications, in particular, to an image processing method, apparatus and device, and a readable storage medium.

BACKGROUND

Processing images on the basis of image classification/detection can improve the pertinence of image processing and make processing results more in line with expectations.

However, in practical applications, deep neural network models for image classification/detection often have a large scale and have a relatively high demand for hardware cost. At the same time, in peripheral applications, terminal devices or edge devices generally have low computing capabilities, and internal memories and power consumption are also limited. Therefore, in order to definitely implement deployment of a deep neural network model, it is necessary to make the model smaller in scale, faster in inference, and lower in power consumption while ensuring that the accuracy of the model remains unchanged. To address this issue, there are currently two main research directions: one is reconstructing an efficient model, and the other is reducing a model size through quantization, cutting and compression.

At present, quantizing a deep neural network model can make the model smaller in scale and lower the demand for hardware, but different quantization manners also make the quantization process spend much time, or affect the performance of the quantized model. This makes it difficult to meet a requirement for the image classification/detection accuracy.

To sum up, problems such as how to effectively improve the accuracy of classification processing in image processing are currently urgent technical problems for those skilled in the art.

SUMMARY

The present application aims to provide an image processing method, apparatus and device and a readable storage medium. In a process of quantizing a deep neural network model, the model is quantized on the basis of the weight features by extracting weight features of a floating point type deep neural network model, whereby a performance decline caused by quantization can be avoided. In such a way, when an image is processed, different policies can be used for processing on the basis of more precise classification/detection results, and the accuracy of image processing can be improved.

In order to solve the above technical problems, the present application provides the following technical solutions:

An image processing method is provided, including:
obtaining a target image;
inputting the target image into a quantized target deep neural network model for classification/detection to obtain an output result; and
processing the target image according to a policy corresponding to the output result;
where a process of performing quantization to obtain the target deep neural network model comprises:
obtaining a pre-trained floating point type deep neural network model;
extracting weight features of a deep neural network model;
determining a quantization policy using the weight features; and
quantizing the deep neural network model according to the quantization policy to obtain the target deep neural network model.

In an embodiment, under a circumstance that the weight features are weight parameter features, correspondingly, extracting the weight features of the deep neural network model includes:
calculating a per-layer quantization error and a per-channel quantization error corresponding to the deep neural network model separately; and
determining the per-layer quantization error and the per-channel quantization error as the weight parameter features.

In an embodiment, determining the quantization policy using the weight features includes:
calculating a difference value between the per-layer quantization error and the per-channel quantization error;
determining whether the difference value is within an error range;
in response to the difference value being within the error range, determining that the quantization policy is the per-layer quantization; and
in response to the difference value being not within the error range, determining that the quantization policy is the per-channel quantization, or performing quantization according to a certain quantization unit.

In an embodiment, before determining that the quantization policy is the per-channel quantization, or performing quantization according to the certain quantization unit, the method further includes:
extracting weight channel features of the deep neural network model; and
taking similar weight channels in the deep neural network model as the certain quantization unit by using the weight channel features, wherein the certain quantization unit comprises at least one weight channel.

In an embodiment, under a circumstance that the weight features are weight channel features, correspondingly, extracting the weight features of the deep neural network model includes:
clustering various weight channels in the deep neural network model to obtain clustering results; and
determining the clustering results as the weight channel features.

In an embodiment, clustering the various weight channels in the deep neural network model to obtain the clustering results comprises:
obtaining weight value ranges of the various weight channels in the deep neural network model, and a statistical distribution chart of weight parameter values of the various weight channels; and clustering the various weight channels based on the weight value ranges and the statistical distribution chart of the weight parameter values, to obtain the clustering results.

In an embodiment, determining the quantization policy using the weight features includes:

in response to a number of clusters of the clustering results being 1, determining that the quantization policy is the per-layer quantization;

in response to the number of clusters being equal to a number of the weight channels, determining that the quantization policy is the per-channel quantization; and in response to the number of clusters being greater than 1 and less than the number of the weight channels, taking all the weight channels corresponding to each cluster as an entirety for quantization.

An image processing apparatus is provided, including:

an image obtaining module, configured for obtaining a target image;

an image classification/detection module, configured for inputting the target image into a quantized target deep neural network model for classification/detection to obtain an output result;

an image processing module, configured for processing the target image according to a policy corresponding to the output result; and a model quantization module, configured for quantifying the target deep neural network model, which includes:

a model obtaining unit, configured for obtaining a pre-trained floating point type deep neural network model;

a feature extraction unit, configured for extracting weight features of the deep neural network model;

a policy determining unit, configured for determining a quantization policy using the weight features; and a model quantization unit, configured for quantizing the deep neural network model according to the quantization policy to obtain the target deep neural network model.

An image processing device is provided, including:

a memory, configured for storing a computer program; and a processor, configured for implementing, when executing the computer program, the steps of the above image processing method.

A readable storage medium is provided, storing a computer program. The computer program, when executed by a processor, implements the steps of the above image processing method.

The method provided in the embodiments of the present application is used, including: obtaining a target image; inputting the target image into a quantized target deep neural network model for classification/detection to obtain an output result; and processing the target image according to a policy corresponding to the output result. A process of performing quantization to obtain the target deep neural network model includes: obtaining a pre-trained floating point type deep neural network model; extracting weight features of the deep neural network model; determining a quantization policy using the weight features; and quantizing the deep neural network model according to the quantization policy to obtain the target deep neural network model.

In this method, after the target image is obtained, the target image can be input into the quantized target deep neural network model for classification/detection to obtain the output result, and then the target image is processed according to the strategy corresponding to the output result.

In particular, in this method, in order to save resources occupied by quantization, shorten quantization time, and ensure that the performance of the quantized model is not affected by the quantization, the process of performing quantization to obtain the target deep neural network includes: firstly, obtaining the floating point type deep neural network model to be quantized, then extracting the weight features of the deep neural network model, and determining the quantization policy on the basis of the weight features, and finally quantizing the deep neural network model according to the quantization policy to obtain a model that can be supported in some devices with poor computing capability and small internal memory, such as an edge device/a remote device. Due to the fact that the quantization process is not simply direct per-layer or per-channel quantization, but an applicable quantization policy is obtained by analysis based on the weight features, the process of performing quantization to obtain the target deep neural network model can reduce the occupied resources, shorten the time and also ensure the model performance, thereby ensuring the performance of image classification/detection, and further improving the performance of image classification processing.

Correspondingly, the embodiments of the present application also provide an image processing apparatus and device and a readable storage medium corresponding to the above image processing method, which have the above technical effects, and will not be described again herein.

BRIEF DESCRIPTION OF THE DRAWINGS

In order to describe the embodiments of the present application or the technical solutions in the prior art more clearly, drawings required to be used in the embodiments or the illustration of the existing art will be briefly introduced below. Obviously, the drawings in the illustration below are only some embodiments of the present application. Those ordinarily skilled in the art also can acquire other drawings according to the provided drawings without creative work.

DETAILED DESCRIPTION

In order to make those skilled in the art better understand the solutions of the present application, the present application is further described in detail below with reference to the accompanying drawings and particular implementation modes. Apparently, the described embodiments are merely a part of the embodiments of the present application and not all the embodiments. Based on the embodiments in the present application, all other embodiments obtained by those of ordinary skill in the art without creative work all fall within the protection scope of the present application.

Figure 1:
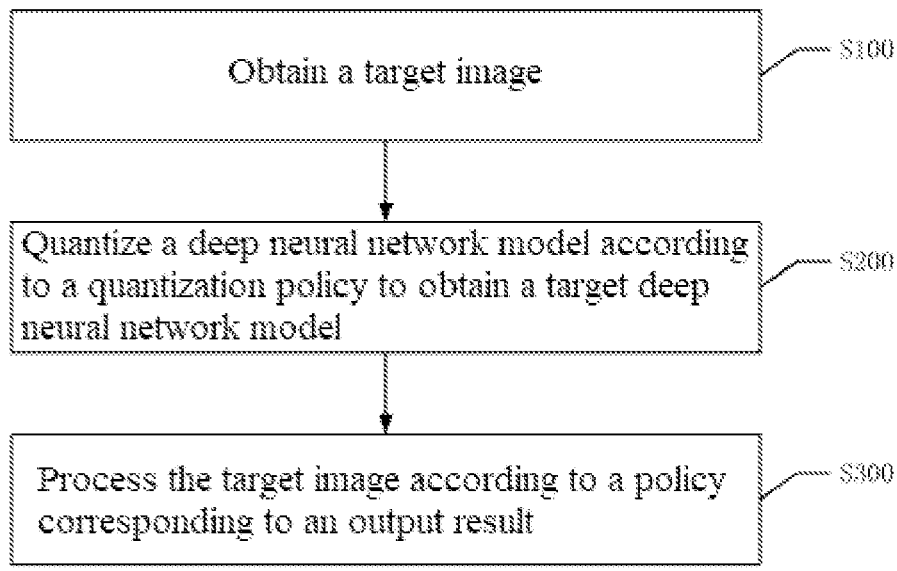
FIG. 1 is a flow chart of implementation of an image processing method in an embodiment of the present application.

Referring to FIG. 1, FIG. 1 is a flow chart of an image processing method in an embodiment of the present application. The method including the following steps:

S100: obtaining a target image.

The target image may be a static image or a dynamic image.

In this embodiment, the target image may be obtained by reading images pre-stored in a readable storage medium. The target image may also be obtained by receiving images sent by other devices. The target image may also be obtained by directly using images acquired by an image acquisition device. An image acquisition scene of the image acquisition device may be a monitoring scene such as road monitoring and intersection monitoring, and other scenes that can acquire images and need to classify and process the images.

S200: inputting the target image into a quantized target deep neural network model for classification/detection to obtain an output result.

After the target image is obtained, the target image may be directly input into the quantified target deep neural network model for classification/detection to obtain a classification or detection result corresponding to the target image.

Of course, in practical applications, in order to facilitate the classification/detection, the target image may also be preprocessed before input into the target deep neural network model, such as normalizing (such as scaling) a size of the image, repairing incomplete images, and cutting the target image.

Generally, although the classification and detection capabilities of the deep neural network model in artificial intelligence have approached or surpassed those of human, there are still problems such as a large model scale and a high requirement for hardware cost in actual deployment. In peripheral applications, terminal devices or edge devices generally have low computing capabilities, and internal memories and power consumption are also limited. Therefore, in order to definitely implement deployment of a deep neural network model, it is necessary to make the model smaller in scale, faster in inference, and lower in power consumption while ensuring that the accuracy of the model remains unchanged. To address this subject, there are currently two main research directions: one is reconstructing an efficient model, and the other is reducing a model size through quantization, cutting and compression.

The focus of this embodiment is to achieve application of a quantization technology in deep neural network models. There are two directions of the current model quantization technology, including: post-training quantization and training-aware quantization. The training-aware quantization method generally refers to performing retraining of low-bit-width fixed point parameters on parameters of the floating point network model. The training is usually performed by professionals. However, the post-training quantization is relatively simple compared to the training-aware quantization, retraining is not required therein, whereby the operation is simple and feasible. Therefore, the post-training quantization method is increasingly applied to the industrial field.

In the post-training quantization solution, model parameter quantization includes two portions: weight parameter quantization and activation output quantization. In the model quantization process, an accuracy loss caused by the model quantization is mainly imputed to a weight parameter quantization error. Therefore, minimizing a weight quantization error is the key to ensuring the accuracy of the model. Therefore, in this embodiment, emphasis lies on the weight parameter quantization.

In the post-training quantization process, an existing weight parameter quantization method mainly uses statistical parameter analysis to find appropriate quantization thresholds, and then performs parameter quantization. According to different value ranges of statistical parameters, the existing quantization of weights mainly includes per-layer quantization and per-channel quantization.

The per-layer quantization mode refers to calculating a quantization threshold of the layer by using a layer as a statistical unit, and then quantizing weight parameters of the layer on the basis of this quantization threshold, with layer as unit. This method is simple in computation in an inference process, but there is only one quantization parameter at one layer. When there are outliers in some channels, a weight quantization result may be affected by the outliers.

The per-channel quantization method defines one channel as a basic quantization unit. Generally speaking, the accuracy of the quantized model in the per-channel quantization method is higher than that of the accuracy of the quantized model in the per-layer quantization method. However, defining one channel as the quantization unit will increase the number of quantization parameters. In an actual inference computation process, the number of accesses to data will be increased, and a computation delay of an inference side will increase.

For example, if a network layer has 1000 input channels, only one quantization parameter needs to be read in an actual inference process on the basis of the per-layer quantization method, but 1000 quantization parameters need to be read on the basis of the per-channel quantization method.

Figure 2:
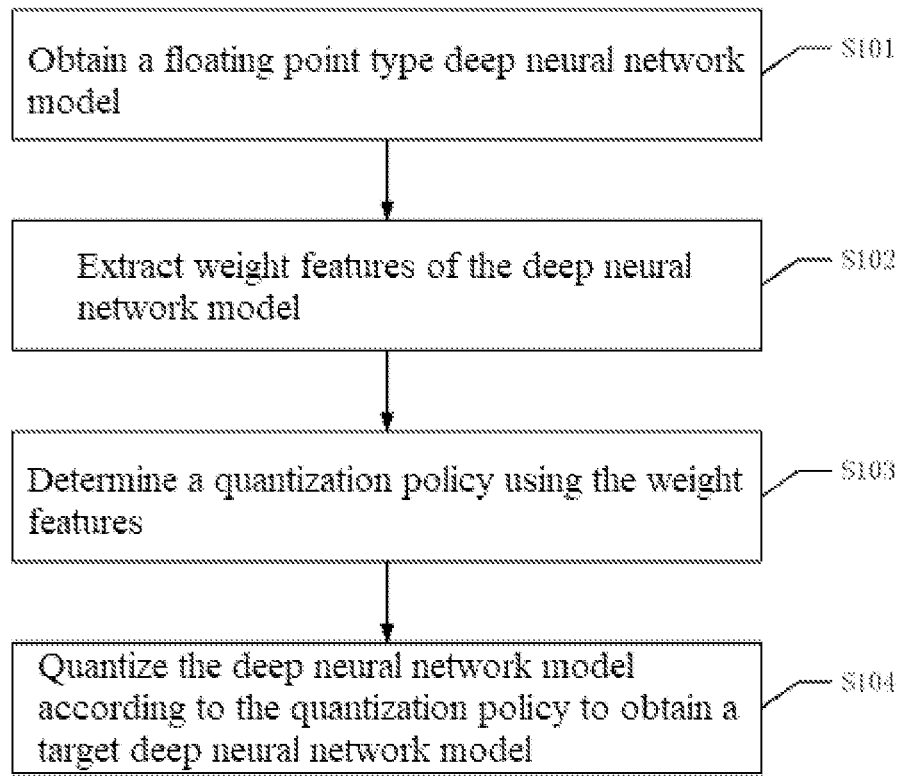
FIG. 2 is a flow chart of implementation of model quantization in an embodiment of the present application.

Based on this, this embodiment provides a quantization solution that can not only reduce the quantization time consumption and the resources occupied by quantization, but also avoid a reduction in accuracy. Referring to FIG. 2, a process of performing quantization to obtain the target deep neural network model is shown, including:

S101: obtaining a pre-trained floating point type deep neural network model.

That is, the deep neural network model is a floating point type parameter model that has been pre-trained. That is, the deep neural network model is obtained after pre-training and includes floating point type parameters. This embodiment will not make restrictions on a certain architecture and internal implementation principle of the deep neural network model, a training method for training the deep neural network model, and the like.

In particular, in this embodiment, a task of the deep neural network model is image classification or image detection. In practical applications, the quantization solution provided in this embodiment can also be used for deep neural network models with other tasks to achieve corresponding quantization effects.

After floating point weight parameters are converted into low-bit-width fixed point model parameters that can be supported by a certain hardware platform, a target deep data network model can be obtained for use in inference computation of a neural network. That is, a difference between a deep neural network model and the target deep neural network model mainly lies in different types of weight parameters.

S102: extracting weight features of the deep neural network model.

It should be noted that in this embodiment, the weight features are used for characterizing weight characteristics of the deep neural network model. The weight features can be defined as corresponding quantization errors obtained by performing a certain quantization method on the deep neural network model. The weight features may also be a distribution of weight values of various weight channels of the deep neural network model, a similarity between the various weight channels, and the like.

In practical applications, the deep neural network model may be analyzed on the basis of certain representation meanings of the weight features to obtain the weight features. Certain implementation methods of obtaining the weight features include, but are not limited to, the following:

Method 1: If the weight features are weight parameter features, correspondingly, step S102 of extracting weight features of the deep neural network model includes:

S102-11: calculating a per-layer quantization error and a per-channel quantization error corresponding to the deep neural network model separately.

S102-12: determining the per-layer quantization error and the per-channel quantization error as the weight parameter features.

Quantization errors that may be caused by quantization of their respective weight parameters are analyzed respectively in units of layer and channel, namely, a quantization error value errorL of per-layer quantization, and a quantization error value errorCj of per-channel quantization. Formula (1) is a quantization error calculation formula.

$$\begin{cases} \text{error} = \sum_{i=1}^{m}(W_i - W_{qi}), m \text{ is the number of weight parameters} \\ W_{qi} = \text{round}\left(\frac{W_i}{\text{step}}\right) * \text{step} \\ \text{step} = \frac{\text{threshold}}{2^{k-1} - 1} \end{cases} \quad (1)$$

where $W_i$ is an original weight value before quantization, and $W_{qi}$ is a weight value after quantization; and threshold is a quantization threshold, such as $MAX_L$ or $MAX_{Cj}$. A sum of layer quantization errors calculated using $MAX_L$ as the quantization threshold is recorded as $\text{error}_L$, and a sum of channel quantization errors calculated using $MAX_{Cj}$ as the quantization threshold is recorded as $\text{error}_{Cj}$.

That is, with channel as unit, an average quantization error of all channels is shown in Formula (2), where N represents the number of all the channels in this layer, and s represents the number of weight parameters of each channel.

$$\overline{\text{error}_C} = \frac{1}{N * s} \sum_{j=1}^{N} \text{error}_{Cj} \quad (2)$$

With layer as unit, an average quantization error of all weight parameters is shown in Formula (3).

$$\overline{\text{error}_L} = \frac{1}{N * s} * \text{error}_L \quad (3)$$

Method 2: If the weight features are weight channel features, correspondingly, step S102 of extracting weight features of the deep neural network model includes:

Step S102-21: clustering various weight channels in the deep neural network model to obtain clustering results.

Clustering the weight channels can be defined as dividing channels with similar weight ranges into one category.

In one certain implementation of the present application, step S102-21 may include:

S102-21-1: obtaining weight value ranges of the various weight channels in the deep neural network model, and a statistical distribution chart of weight parameter values of the various weight channels.

S102-21-2: clustering the various weight channels on the basis of the weight value ranges and the statistical distribution chart of weight parameter values, to obtain the clustering results.

For ease of description, S102-21-1 and S102-21-2 are combined for explanation below.

In the clustering analysis process, required information includes a maximum weight value $\text{Max}_{Cj}$ and a minimum weight value Mind per channel, as well as a histogram statistical distribution $P_{Cj}$ of the various channels. A certain process of clustering analysis based on these pieces of information:

Step 1: firstly, constructing an effective weight range of each channel with the minimum value Min and the maximum value Max, and then calculating an effective overlap space between the effective weight ranges; and if the effective overlap space between the effective weight ranges is greater than a certain threshold, selecting the effective weight ranges as a group of candidate quantization units.

Step 2: based on Step 1, calculating weight value histogram distribution similarities between the channels of the same group of candidate quantization units to determine whether the channels of the same group of candidate quantization units can be quantized as an entirety; and if the channels meet the requirement, confirming that channels belong to the same group of quantization units, otherwise, performing further processing.

Step 1 and Step 2 are repeated until all the channels are analyzed, and clustering results are obtained.

Figure 3:
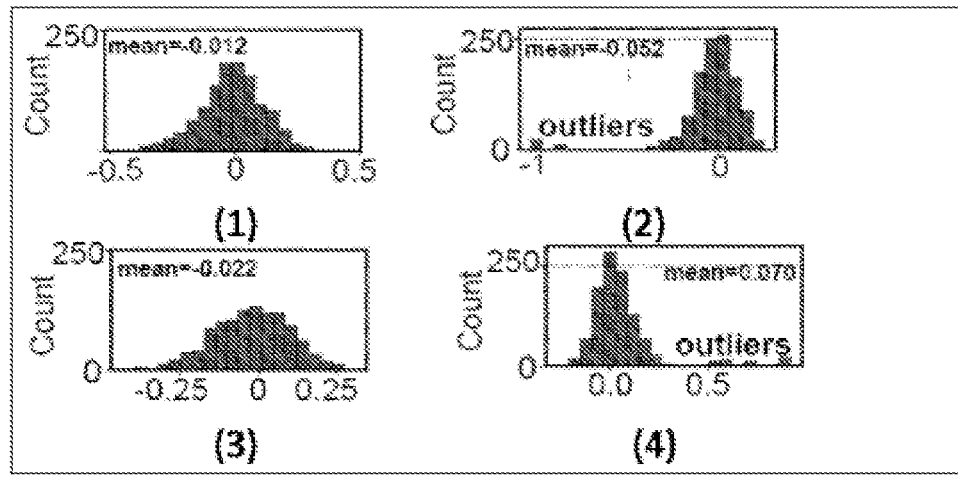
FIG. 3 is a schematic diagram of statistical distribution of weight parameter values in an embodiment of the present application.

FIG. 3 is taken as an example (where Count refers to counting; mean refers to a mean; and outliers refers to outliers). An evaluation process of the quantization units will be further explained. As shown in FIG. 3, a weight distribution range of channel 1 is R1: −0.35 to 0.3; a weight distribution range of channel 2 is R2: −1 to 0.25; a weight distribution range of channel 3 is R3: −0.37 to 0.3; and a weight distribution range of channel 4 is R4: −0.12 to 1. An overlap ratio of the weight distribution ranges of the various channels can be calculated by Formula (4):

$$\text{overlap} R = \frac{R_x \cap R_y}{R_x \cup R_y} \quad (4)$$

where $R_x \cap R_y$ represents an overlapping region of two channels, and $R_x \cup R_y$ represents a maximum region range after two regions are merged. It is calculated through Formula (5) that an overlapping region overlapR of the weight distribution ranges of channel 1 and channel 3 is approximately 0.97. Assuming that a preset threshold is 0.85 (of course, the preset threshold can also be other values. This is only one example herein), channel 1 and channel 3 can be pre-selected as one group of quantization units, and channel 2 and channel 4 cannot be combined with other channels.

The histogram statistical distribution similarity between channel 1 and channel 3 is then further estimated, and whether the two channels are convenient to be merged together is determined again. For example, whether the similarity is greater than the preset threshold (which can be set in advance on the basis of a merging requirement, and will not be discussed repeatedly here) is determined. If the similarity is greater than the preset threshold, channel 1 and channel 3 are merged together and are regarded as one category.

A certain calculation method is as shown in Formula (5). A similarity between the weight values of two channels can be calculated according to Formula (5). If the similarity is greater than the preset threshold, it indicates that the two channels can be combined as an entirety for later quantization processing.

$$\rho(P_{Ci}, P_{Cj}) = \Sigma_{s=1}^{N} \sqrt{P_{Ci}(s) * P_{Cj}(s)} \tag{5}$$

Through analysis, it is finally concluded that an optimal quantization unit for this layer is that channel 1 and channel 3 can be combined, which can be regarded as one category, while channel 2 and channel 4 are each regarded as one category.

Step S102-22: determining the clustering results as the weight channel features.

After the clustering results are obtained, the clustering results are used as the weight channel features. For example, if a layer has a total of N weight channels, and the clustering results indicate that there is a total of M categories ($1 \leq M \leq N$), the M categories are considered as the weight channel features.

S103: determining a quantization policy using the weight features.

Methods of determining the quantization policy may be different because of different weight features, but the core of the determining process is to reduce resources occupied by the quantization process, reduce the time consumption, and ensure the accuracy of the quantized deep neural network model.

Based on different weight features, the certain quantization method corresponding to the quantization policy varies. The quantization policy can be single per-layer quantization, single per-channel quantization, or quantization per certain quantization unit. That is, for per-channel quantization, a quantization unit is a channel; for per-layer quantization, a quantization unit is a layer; and for quantization per certain quantization unit, at least two channels, the number of which is less than the number of channels of an entire layer, are used as quantization units.

The method of determining the quantization policy is described in detail below by taking different weight features as an example:

Method 1: If the weight features are weight parameter features, Step S103 of determining a quantization policy using the weight features includes:

Step I: calculating a difference value between the per-layer quantization error and the per-channel quantization error;

Step II: determining whether the difference value is within an error range; Step III: if the difference value is within the error range, determining that the quantization policy is per-layer quantization; and Step IV: if the difference value is not within the error range, determining that the quantization policy is per-channel quantization, or performing quantization according to a certain quantization unit.

An average channel quantization error $\overline{error_C}$ and an average layer quantization error $\overline{error_L}$, can be compared:

$$\text{diff} = |\overline{error_C} - \overline{error_L}| \tag{6}$$

If the two average errors are very close (namely, the difference value, diff, is very small), for example, if the difference value is less than a preset threshold T, it indicates that compared to the channel-based quantization, the layer-based quantization will not cause an extremely high quantization accuracy loss. Therefore, this layer can be overall quantized with layer as unit.

If the difference value is very large, for example, if it is greater than the preset threshold T, it is determined to use the per-channel quantization, or to perform the quantization according to the certain quantization unit. According to the certain quantization unit, the quantization cost can be between that of per-channel quantization and that of per-layer quantization. That is, a certain number of weight channels are regarded as one quantization unit, thereby reducing quantization reading parameters. That is, the certain quantization unit is different from both a channel-based quantization unit and a layer-based quantization unit. For the certain quantization unit, two or more weight channels, the number of which is less than the number of channels of the entire layer, are substantially regarded as one unit. For example, if there is channel 1, channel 2, channel 3, channel 4 and channel 5, channel 1 and channel 2 can be used as one certain quantization unit, and channel 3 and 4 can be used as one quantization unit. Quantization is performed according to the certain quantization unit. Per-channel quantization is performed on channel 5.

In one certain implementation of the present application, in order to lower the resource requirement of the quantization process, after it is determined that the difference value is not within the error range, before determining that the quantization policy is per-channel quantization, or performing quantization according to a certain quantization unit, the following steps can also be executed:

Step 1: extracting weight channel features of the deep neural network model; and Step 2: taking similar weight channels in the deep neural network model as the certain quantization unit, wherein the certain quantization unit includes at least one weight channel.

The certain extraction method of the weight channel features can be seen above. After the weight channel features are obtained, several similar weight channels can be regarded as one certain quantization unit. In this way, quantizing the certain quantization unit is equivalent to performing per-layer quantization on the similar weight channels. Channels without similar weights are directly determined to be subjected to per-channel quantization.

Method 2: If the weight features are weight channel features, Step S103 of determining a quantization policy using the weight features includes:

Case I: if the number of clusters of the clustering results is 1, determining that the quantization policy is per-layer quantization.

Case II: if the number of clusters is equal to the number of the weight channels, determining that the quantization policy is per-channel quantization.

Case II: if the number of clusters is greater than 1 and less than the number of the weight channels, taking all the weight channels corresponding to each cluster as an entirety for quantization.

For ease of explanation, the above three cases are combined for explanation.

The quantization policy is obtained by selecting or combining the per-channel quantization and the per-layer quantization using a clustering-like idea. If there is a total of N clustering points of the clustering results, where N is the number of weight channels of a current layer, a minimum number of clusters of this layer is 1, and a maximum number of clusters is N.

When the number of clusters is equal to 1, it is determined that the quantization policy is the per-layer quantization.

When the number of clusters is equal to N, it is determined that the quantization policy is the per-channel quantization.

When the number of clusters is within (1, N), the quantization policy is a combination of the two quantization methods. As shown in FIG. 3, during quantization processing, although channel 2 and channel 4 have different channel outliers, channel 1 and channel 3 can be quantized as an entirety. This combination not only reduces quantization parameters, but also does not increase quantization errors. That is, per-channel quantization is performed on 1 and 3, and per-layer quantization is performed on 2 and 4.

Figure 4:
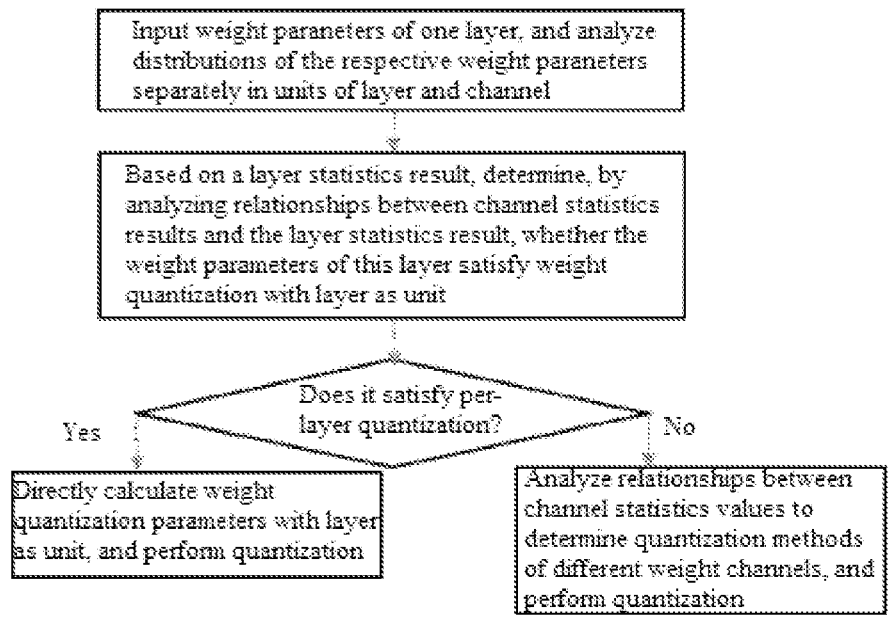
FIG. 4 is a schematic diagram of a quantization policy determining process in an embodiment of the present application.

It should be noted that in some certain implementations of the present application, referring to FIG. 4, in order to reduce the time consumption and computing resource requirements caused by clustering analysis, the quantization policy can also be determined according to Method 1. Only when it is determined that the difference value is not within the error range, can the quantization policy be determined according to Method 2 (of course, only when the quantization policy needs to be determined according to Method 2, can the weight channel features be extracted). Of course, for other quantifiable models that are not neural network models, the quantization method provided in this embodiment of the present application can be used to quantify the models, and corresponding technical effects can also be achieved.

S104: quantizing the deep neural network model according to the quantization policy to obtain the target deep neural network model.

After the quantization policy is determined, the deep neural network model can be quantized according to the quantization policy to obtain the target deep neural network model.

It should be noted that in practical applications, before Step 200, the deep neural network model is quantized with reference to FIG. 2 to obtain the target deep neural network model. That is, it is not necessary to repeatedly perform the quantization operations from Step S101 to Step S104 described above before each execution of Step S200.

S300: processing the target image according to a policy corresponding to the output result.

In this embodiment, different processing policies can be used for the target image according to different output results.

If the task of the target deep neural network model corresponds to image classification, the output result corresponds to a certain category of an object in the target image, that is, the target image is processed according to the processing policies corresponding to different categories. For example, if the target image is an image corresponding to a safety monitoring scene, a person is detected, and an alarm is sounded. If other animals are detected, they are ignored.

If the task of the target deep neural network model itself corresponds to image detection, the output result corresponds to a detection result obtained from the image detection, and different detection results can also correspond to different processing policies.

How to set a policy and how to make an output result correspond to the policy can be set according to actual application requirements. For details, refer to an existing image classification processing solution, which will not be described in detail here.

The method provided in the embodiments of the present application is used, including: obtaining a target image; inputting the target image into a quantized target deep neural network model for classification/detection to obtain an output result; and processing the target image according to a policy corresponding to the output result. A process of performing quantization to obtain the target deep neural network model includes: obtaining a pre-trained floating point type deep neural network model; extracting weight features of the deep neural network model; determining a quantization policy using the weight features; and quantizing the deep neural network model according to the quantization policy to obtain the target deep neural network model.

In this method, after the target image is obtained, the target image can be input into the quantized target deep neural network model for classification/detection to obtain the output result, and then the target image is processed according to the strategy corresponding to the output result. In particular, in this method, in order to save resources occupied by quantization, shorten quantization time, and ensure that the performance of the quantized model is not affected by the quantization, the process of performing quantization to obtain the target deep neural network includes: first obtaining the floating point type deep neural network model to be quantized, then extracting the weight features of the deep neural network model, and determining the quantization policy on the basis of the weight features, and finally quantizing the deep neural network model according to the quantization policy to obtain a model that can be supported in some devices with poor computing capability and small internal memory, such as an edge device/a remote device. Due to the fact that the quantization process is not simply direct per-layer or per-channel quantization, but a matching quantization policy is obtained by analysis based on the weight features, the process of performing quantization to obtain the target deep neural network model can reduce the occupied resources, shorten the time and also ensure the model performance, thereby ensuring the performance of image classification/detection, and further improving the performance of image classification processing.

In order to facilitate those skilled in the art to better understand the quantization process in the image processing method provided in this embodiment of the present application, the quantization process is described in detail in FIG. 5 below.

Figure 5:
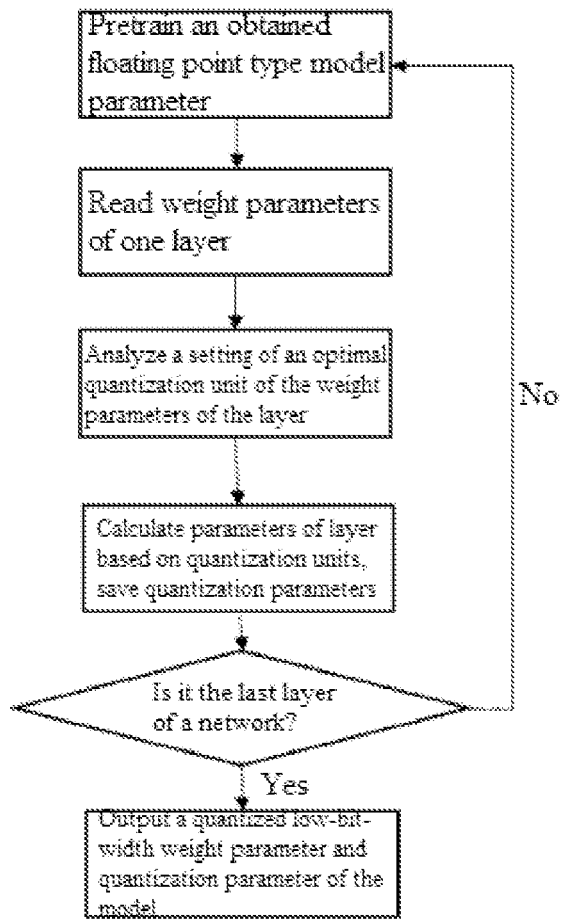
FIG. 5 is a flow chart of quantization in an embodiment of the present application.

As shown in FIG. 5, a certain calculation process of this method includes the following steps:

Step 1: inputting weight parameters of a pre-trained floating point type model;

Step 2: reading the weight parameters of the floating point type model, and automatically analyzing the characteristics of the weight parameters of the layer to determine an optimal quantization unit between different channels of the weight parameters of the layer;

Step 3: based on the weight parameter quantization unit obtained through analysis, performing low-bit-width weight parameter quantization according to a device width requirement, and saving quantized weight parameters and quantization parameters; and determining whether the current layer is the last layer of the network model; if the current layer is the last layer of the network model, outputting the quantized low-bit-width weight parameters and quantization parameters of the model; and if the current layer is not the last layer of the network model, continuing to perform Step 1 to Step 3.

It can be seen that the model quantization solution provided in this embodiment of the present application can automatically achieve analysis and selection of a quantization unit. In order to minimize a quantization error and reduce the number of quantization parameters, a distribution characteristic of the weight parameters of each layer are analyzed to determine the optimal quantization unit between different weight parameters, rather than simply using a layer as a quantization unit or a channel as a quantization unit. In a case of ensuring that the weight parameters are not lost as much as possible, the low-bit-width fixed point quantization of the weight parameters is performed to ensure: When low-bit-width weight parameters are used, the deep neural network model can still maintain the accuracy (classification, detection, or recognition accuracy) of the original floating point type weight parameters, especially in model requirements for a lower width, such as 2 bits, 3 bits and 4 bits.

Corresponding to the above method embodiment, the embodiments of the present application further provide an image processing apparatus. The image processing apparatus described below may correspondingly refer to the image processing method described above.

Figure 6:
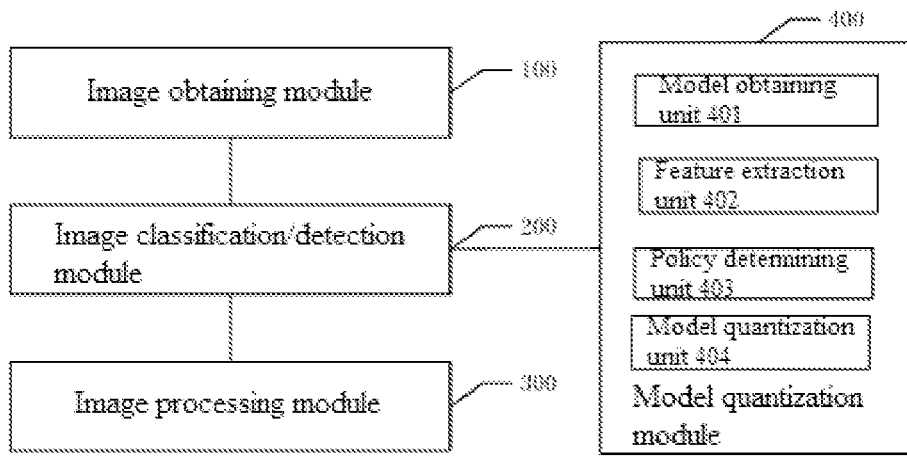
FIG. 6 is a schematic structural diagram of an image processing apparatus in an embodiment of the present application.

As shown in FIG. 6, the apparatus includes the following modules:

an image obtaining module 100, configured for obtaining a target image;

an image classification/detection module 200, configured for inputting the target image into a quantized target deep neural network model for classification/detection to obtain an output result;

an image processing module 300, configured for processing the target image according to a policy corresponding to the output result; and a model quantization module 400, configured for quantifying the target deep neural network model, which includes:

a model obtaining unit 401, configured for obtaining a pre-trained floating point type deep neural network model;

a feature extraction unit 402, configured for extracting weight features of the deep neural network model;

a policy determining unit 403, configured for determining a quantization policy using the weight features; and a model quantization unit 404, configured for quantizing the deep neural network model according to the quantization policy to obtain the target deep neural network model.

The apparatus provided in the embodiments of the present application is used, which is configured for: obtaining a target image; inputting the target image into a quantized target deep neural network model for classification/detection to obtain an output result; and processing the target image according to a policy corresponding to the output result. A process of performing quantization to obtain the target deep neural network model includes: obtaining a pre-trained floating point type deep neural network model; extracting weight features of the deep neural network model; determining a quantization policy using the weight features; and quantizing the deep neural network model according to the quantization policy to obtain the target deep neural network model.

In this apparatus, after the target image is obtained, the target image can be input into the quantized target deep neural network model for classification/detection to obtain the output result, and then the target image is processed according to the strategy corresponding to the output result. In particular, in this apparatus, in order to save resources occupied by quantization, shorten quantization time, and ensure that the performance of the quantized model is not affected by the quantization, the process of performing quantization to obtain the target deep neural network includes: first obtaining the floating point type deep neural network model to be quantized, then extracting the weight features of the deep neural network model, and determining the quantization policy on the basis of the weight features, and finally quantizing the deep neural network model according to the quantization policy to obtain a model that can be supported in some devices with poor computing capability and small internal memory, such as an edge device/a remote device. Due to the fact that the quantization process is not simply direct per-layer or per-channel quantization, but a matching quantization policy is obtained by analysis based on the weight features, the process of performing quantization to obtain the target deep neural network model can reduce the occupied resources, shorten the time and also ensure the model performance, thereby ensuring the performance of image classification/detection, and further improving the performance of image classification processing.

In one certain implementation of the present application, if the weight features are weight parameter features, correspondingly, the feature extraction unit 402 is configured for: calculating a per-layer quantization error and a per-channel quantization error corresponding to the deep neural network model separately; and determining the per-layer quantization error and the per-channel quantization error as the weight parameter features.

In one certain implementation of the present application, the policy determining unit 403 is configured for: calculating a difference value between the per-layer quantization error and the per-channel quantization error; determining whether the difference value is within an error range; if the difference value is within the error range, determining that the quantization policy is per-layer quantization; and if the difference value is not within the error range, determining that the quantization policy is per-channel quantization, or performing quantization according to a certain quantization unit.

In one certain implementation of the present application, the policy determining unit 403 is further configured for: extracting weight channel features of the deep neural network model; and taking similar weight channels in the deep neural network model as the certain quantization unit by using the weight channel features, the certain quantization unit including at least one weight channel.

In one certain implementation of the present application, if the weight features are weight channel features, correspondingly, the feature extraction unit 402 is configured for: clustering various weight channels in the deep neural network model to obtain clustering results; and determining the clustering results as the weight channel features.

In one certain implementation of the present application, the feature extraction unit 402 is configured for: obtaining weight value ranges of the various weight channels in the deep neural network model, and a statistical distribution chart of weight parameter values of the various weight channels; and clustering the various weight channels on the basis of the weight value ranges and the statistical distribution chart of weight parameter values, to obtain the clustering results.

In one certain implementation of the present application, the policy determining unit 403 is configured for: if the number of clusters of the clustering results is 1, determining that the quantization policy is per-layer quantization; if the number of clusters is the number of the weight channels, determining that the quantization policy is per-channel quantization; and if the number of clusters is greater than 1 and less than the number of the weight channels, taking all the weight channels corresponding to each cluster as an entirety for quantization.

Corresponding to the above method embodiment, the embodiments of the present application further provide an image processing device. The image processing device described below may correspondingly refer to the image processing method described above.

Figure 7:
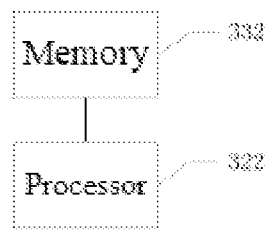
FIG. 7 is a schematic structural diagram of an image processing device in an embodiment of the present application.

Referring to FIG. 7, the image processing device includes:
a memory 332, configured for storing a computer program; and
a processor 322, configured for implementing, when executing the computer program, the steps of the image processing method in the above method embodiment.

Figure 8:
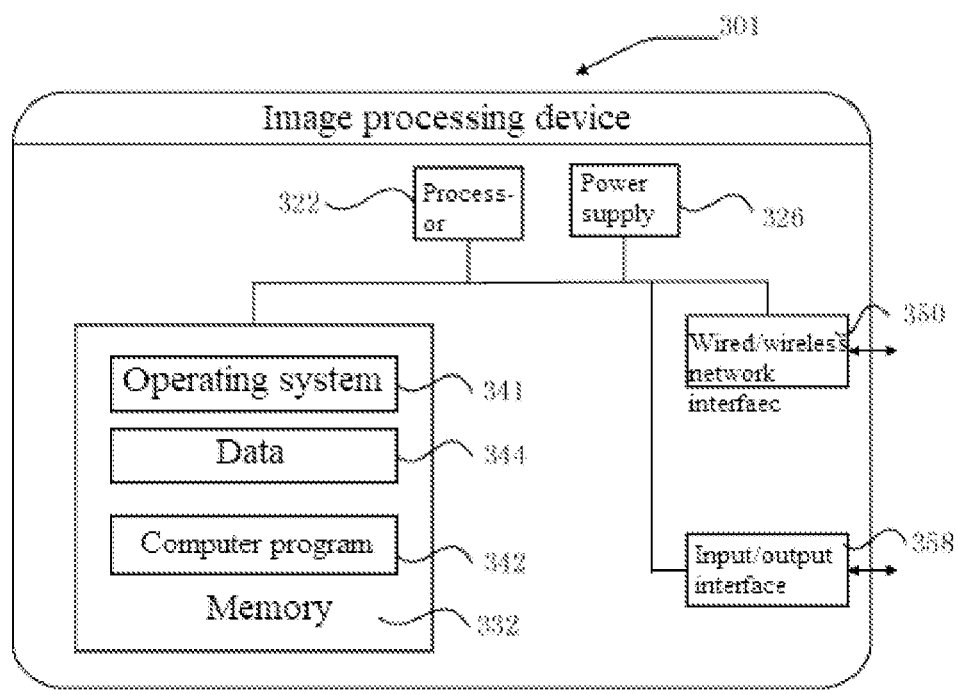
FIG. 8 is a schematic diagram of a particular structure of an image processing device in an embodiment of the present application.

Referring to FIG. 8, FIG. 8 is a schematic diagram of a certain structure of an image processing device provided by this embodiment. The image processing device may vary greatly due to different configurations or performance, and may include one or more central processing units (CPUs) 322 (for example, one or more processors) and a memory 332. The memory 332 stores one or more computer application programs 342 or data 344. The memory 332 can be a volatile memory or a non-volatile memory. The programs stored in the memory 332 can include one or more modules (not shown in the figure), and each module can include a series of instruction operations in a data processing device. Much further, the CPU 322 can be configured for communicating with the memory 332 and performing the series of instruction operations in the memory 332 on the image processing device 301.

The image processing device 301 can further include one or more power supplies 326, one or more wired or wireless network interfaces 350, one or more input/output interfaces 358, and/or, one or more operating systems 341.

The steps in the image processing method described above can be implemented by the structures of the image processing device.

Corresponding to the above method embodiment, the embodiments of the present application further provide a readable storage medium. The readable storage medium described below may correspondingly refer to the image processing method described above.

A readable storage medium is provided, storing a computer program. The computer program, when executed by a processor, implements the steps of the image processing method in the above method embodiment.

The readable storage medium may be various readable storage media capable of storing program codes, such as a USB flash disk, a mobile hard disk, a read-only memory (ROM), a random access memory (RAM), a magnetic disk, or an optical disk.

Persons skilled in the art can further realize that in connection with the units and algorithm steps of all examples described in the embodiments disclosed herein, they can be implemented by electronic hardware, computer software or a combination of electronic hardware and computer software. In order to clearly describe the interchangeability of hardware and software, the constitutions and steps of all the examples have been generally described according to functions in the above illustration. Whether these functions are executed by hardware or software depends on the certain application and design constraints of the technical solution. Persons skilled in the art can use different methods for each certain application to realize the described functions, but such implementation should not be considered as being beyond the scope of the present application.

What is claimed is:

1. An image processing method, comprising:
   obtaining a target image;
   inputting the target image into a quantized target deep neural network model for at least one of classification or detection to obtain an output result; and
   processing the target image according to a policy corresponding to the output result; and
   performing quantization to obtain the target deep neural network model by:
   obtaining a pre-trained floating point type deep neural network model;
   extracting weight features of a deep neural network model;
   determining a quantization policy using the weight features; and
   quantizing the deep neural network model according to the quantization policy to obtain the target deep neural network model.

2. The image processing method according to claim 1, wherein under a circumstance that the weight features are weight parameter features, extracting the weight features of the deep neural network model comprises:
   calculating a per-layer quantization error and a per-channel quantization error corresponding to the deep neural network model separately; and
   determining the per-layer quantization error and the per-channel quantization error as the weight parameter features.

3. The image processing method according to claim 2, wherein determining the quantization policy using the weight features comprises:
   calculating a difference value between the per-layer quantization error and the per-channel quantization error;
   determining whether the difference value is within an error range;
   in response to the difference value being within the error range, determining that the quantization policy is the per-layer quantization; and
   in response to the difference value being not within the error range, determining that the quantization policy is the per-channel quantization, or performing quantization according to a certain quantization unit.

4. The image processing method according to claim 3, wherein before determining that the quantization policy is the per-channel quantization, or performing quantization according to the certain quantization unit, the method further comprises:
   extracting weight channel features of the deep neural network model; and
   taking similar weight channels in the deep neural network model as the certain quantization unit by using the weight channel features, wherein the certain quantization unit comprises at least one weight channel.

5. The image processing method according to claim 1, wherein under a circumstance that the weight features are weight channel features, extracting the weight features of the deep neural network model comprises:
　　clustering various weight channels in the deep neural network model to obtain clustering results; and
　　determining the clustering results as the weight channel features.

6. The image processing method according to claim 5, wherein clustering the various weight channels in the deep neural network model to obtain the clustering results comprises:
　　obtaining weight value ranges of the various weight channels in the deep neural network model, and a statistical distribution chart of weight parameter values of the various weight channels; and
　　clustering the various weight channels based on the weight value ranges and the statistical distribution chart of the weight parameter values, to obtain the clustering results.

7. The image processing method according to claim 5, wherein the determining a quantization policy using the weight features comprises:
　　in response to the number of clusters of the clustering results being 1, determining that the quantization policy is the per-layer quantization;
　　in response to the number of clusters being equal to a number of the weight channels, determining that the quantization policy is the per-channel quantization; and
　　in response to the number of clusters being greater than 1 and less than the number of the weight channels, taking all the weight channels corresponding to each cluster as an entirety for quantization.

8. An image processing device, comprising:
　a memory storing a computer program; and
　a processor configured to execute the computer program wherein the processor, upon execution of the computer program, is configured to:
　obtain a target image;
　input the target image into a quantized target deep neural network model for at least one of classification or detection to obtain an output result;
　process the target image according to a policy corresponding to the output result; and
　perform quantization to obtain the target deep neural network model by:
　　obtaining a pre-trained floating point type deep neural network model;
　　extracting weight features of a deep neural network model;
　　determining a quantization policy using the weight features; and
　　quantizing the deep neural network model according to the quantization policy to obtain the target deep neural network model.

9. The image processing device according to claim 8, wherein the processor, upon execution of the computer program, is further configured to:
　　calculate a per-layer quantization error and a per-channel quantization error corresponding to the deep neural network model separately; and
　　determine the per-layer quantization error and the per-channel quantization error as the weight parameter features.

10. The image processing device according to claim 9, wherein the processor, upon execution of the computer program, is further configured to:
　　calculate a difference value between the per-layer quantization error and the per-channel quantization error;
　　determine whether the difference value is within an error range;
　　in response to the difference value being within the error range, determine that the quantization policy is the per-layer quantization; and
　　in response to the difference value being not within the error range, determine that the quantization policy is the per-channel quantization, or perform quantization according to a certain quantization unit.

11. The image processing device according to claim 10, wherein the processor, upon execution of the computer program, is further configured to:
　　extract weight channel features of the deep neural network model; and
　　take similar weight channels in the deep neural network model as the certain quantization unit by using the weight channel features, wherein the certain quantization unit comprises at least one weight channel.

12. The image processing device according to claim 8, wherein the processor, upon execution of the computer program, is further configured to:
　　cluster various weight channels in the deep neural network model to obtain clustering results; and
　　determine the clustering results as the weight channel features.

13. The image processing device according to claim 12, wherein the processor, upon execution of the computer program, is further configured to:
　　obtain weight value ranges of the various weight channels in the deep neural network model, and a statistical distribution chart of weight parameter values of the various weight channels; and
　　cluster the various weight channels based on the weight value ranges and the statistical distribution chart of the weight parameter values, to obtain the clustering results.

14. The image processing device according to claim 12, wherein the processor, upon execution of the computer program, is further configured to:
　　in response to the number of clusters of the clustering results being 1, determine that the quantization policy is the per-layer quantization;
　　in response to the number of clusters being equal to a number of the weight channels, determine that the quantization policy is the per-channel quantization; and
　　in response to the number of clusters being greater than 1 and less than the number of the weight channels, take all the weight channels corresponding to each cluster as an entirety for quantization.

15. A non-transitory computer-readable storage medium storing a computer program; and the computer program, when executed by a processor, is configured to cause the processor to:
　obtain a target image;
　input the target image into a quantized target deep neural network model for at least one of classification or detection to obtain an output result;
　process the target image according to a policy corresponding to the output result; and
　perform quantization to obtain the target deep neural network model by:
　　obtaining a pre-trained floating point type deep neural network model;
　　extracting weight features of a deep neural network model;
　　determining a quantization policy using the weight features; and quantizing the deep neural network model according to the quantization policy to obtain the target deep neural network model.

16. The non-transitory computer-readable storage medium according to claim 15, wherein the computer program, upon execution by the processor, is further configured to cause the processor to:
calculate a per-layer quantization error and a per-channel quantization error corresponding to the deep neural network model separately; and
determine the per-layer quantization error and the per-channel quantization error as the weight parameter features.

17. The non-transitory computer-readable storage medium according to claim 16, wherein the computer program, upon execution by the processor, is further configured to cause the processor to:
calculate a difference value between the per-layer quantization error and the per-channel quantization error;
determine whether the difference value is within an error range;
in response to the difference value being within the error range, determine that the quantization policy is the per-layer quantization; and
in response to the difference value being not within the error range, determine that the quantization policy is the per-channel quantization, or perform quantization according to a certain quantization unit.

18. The non-transitory computer-readable storage medium according to claim 17, wherein the computer program, upon execution by the processor, is further configured to cause the processor to:
extract weight channel features of the deep neural network model; and
take similar weight channels in the deep neural network model as the certain quantization unit by using the weight channel features, wherein the certain quantization unit comprises at least one weight channel.

19. The non-transitory computer-readable storage medium according to claim 15, wherein the computer program, upon execution by the processor, is further configured to cause the processor to:
cluster various weight channels in the deep neural network model to obtain clustering results; and
determine the clustering results as the weight channel features.

20. The non-transitory computer-readable storage medium according to claim 19, wherein the computer program, upon execution by the processor, is further configured to cause the processor to:
obtain weight value ranges of the various weight channels in the deep neural network model, and a statistical distribution chart of weight parameter values of the various weight channels; and
cluster the various weight channels based on the weight value ranges and the statistical distribution chart of the weight parameter values, to obtain the clustering results.

* * * * *